United States Patent
Ho et al.

(10) Patent No.: US 9,584,416 B2
(45) Date of Patent: Feb. 28, 2017

(54) SYSTEMS AND METHODS TO PROVIDE FLOW CONTROL FOR MOBILE DEVICES

(75) Inventors: Sai Yiu Duncan Ho, San Diego, CA (US); Shailesh Maheshwari, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 297 days.

(21) Appl. No.: 12/795,530

(22) Filed: Jun. 7, 2010

(65) Prior Publication Data

US 2010/0309788 A1    Dec. 9, 2010

Related U.S. Application Data

(60) Provisional application No. 61/185,049, filed on Jun. 8, 2009.

(51) Int. Cl.
| | | |
|---|---|---|
| *H04L 12/801* | (2013.01) | |
| *H04L 12/825* | (2013.01) | |
| *H04W 28/22* | (2009.01) | |

(52) U.S. Cl.
CPC ............ *H04L 47/10* (2013.01); *H04L 47/14* (2013.01); *H04L 47/263* (2013.01); *H04W 28/22* (2013.01)

(58) Field of Classification Search
CPC ....... H04L 47/10; H04L 47/263; H04L 47/14; H04W 28/22

(Continued)

(56) References Cited

U.S. PATENT DOCUMENTS 5,825,761 A * 10/1998 Tanaka et al. ................ 370/333
6,983,153 B2    1/2006 Jain et al.
(Continued)

FOREIGN PATENT DOCUMENTS

CN    101103643 A    1/2008
JP    2003318814 A    11/2003
(Continued)

OTHER PUBLICATIONS

3rd Generation Partnership Project: 3rd Generation Partnership Project; Technical Specification Group Radio Access Network; Evolved Universal Terrestrial Radio Access (E-UTRA) Medium Access Control (MAC) protocol specification (Release 8), 3GPP TS 36.32.

(Continued)

*Primary Examiner* — Kan Yuen
*Assistant Examiner* — Richard Chang

(57) ABSTRACT

Systems, methods, and apparatuses are disclosed to facilitate wireless communications. User equipment (UE), such as a mobile device, identifies data congestion and transmits a recommended data rate modification wireless signal (e.g., a recommended reduced data rate) to the base station that is transmitting data to the UE. The base station may reduce the data rate of the down link (DL) to the reduced data rate. The UE may then receive data from the base station at the reduced data rate. Therefore, flow control may be implemented at the base station side (e.g., sometimes referred to as the Network (NW) side) based upon the reduced data rate modification determined and transmitted by the UE to the base station. In this way, the data rate transmission to the UE can be reduced to allow the UE to successfully process received data and successfully perform its functions.

41 Claims, 8 Drawing Sheets

(58) Field of Classification Search
USPC .................... 370/236, 333, 338; 455/266
See application file for complete search history.

(56) References Cited

U.S. PATENT DOCUMENTS

| | | | |
|---|---|---|---|
| 7,706,274 B2* | 4/2010 | Koning ................. | H04L 69/163 370/229 |
| 8,238,367 B1* | 8/2012 | Choi et al. .................... | 370/468 |
| 2004/0203973 A1 | 10/2004 | Khan | |
| 2005/0143084 A1* | 6/2005 | Cheng et al. ............. | 455/452.2 |
| 2006/0030345 A1* | 2/2006 | Jain et al. .................... | 455/515 |
| 2006/0056382 A1 | 3/2006 | Yamada et al. | |
| 2006/0056443 A1* | 3/2006 | Tao et al. ...................... | 370/462 |
| 2006/0245352 A1* | 11/2006 | Kang et al. ................... | 370/229 |
| 2006/0264218 A1* | 11/2006 | Zhang et al. ................. | 455/450 |
| 2008/0095185 A1* | 4/2008 | DiGirolamo et al. ........ | 370/464 |
| 2009/0067335 A1* | 3/2009 | Pelletier .............. | H04L 41/5025 370/238 |
| 2009/0092202 A1* | 4/2009 | Kim et al. ..................... | 375/295 |

FOREIGN PATENT DOCUMENTS

| | | |
|---|---|---|
| JP | 2005518143 A | 6/2005 |
| JP | 2006101477 A | 4/2006 |
| KR | 20060112999 A | 11/2006 |
| WO | 02101956 A1 | 12/2002 |
| WO | WO-03069835 A1 | 8/2003 |

OTHER PUBLICATIONS

Ericsson; "MAC Flow Control" 3GPP Draft; R2-082152 MAC Flow Control, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; Apr. 27, 2008, 27.

Freescale Semiconductor: "DL Flow Control,—initial conditions", 3GPP Draft; R2-082450, 3rd Generation, Partnership Project (3GPP), Mobile, Competence Centre; 650, Route Des, Lucioles; F-06921 Sophia-Antipolis Cedex 32-34; France, vol. RAN WG2.

Fujitsu et al., "DL Flow Controle in LTE", 3GPP Draft; R2-081253, 3rd Generation 8-10, Partnership Project (3GPP), Mobile, Competence Centre ; 650, Route Des , Lucioles ; F-06921 Sophia-Antipolis Cedex , ; France, , vol. RAN WG2, No. Sorrento, Italy; , 20.

International Search Report and Written Opinion—PCT/US2010/037819, International Search Authority—European Patent Office—Sep. 28, 2010.

Motorola: "Flow Control", 3GPP Draft; R2-073540, 3rd Generation, Partnership Project (3GPP), Mobile 13-18, Competence Centre; 650, Route Des, Lucioles: F-06921 Sophia-Antipolis Cedex; France, vol. RAN WG3, No. Athens, Greece; Aug. 17, 2007, Aug. 17.

Nec et al., "DL Flow Control in LTE" 3GPP Draft; R2-082487, 3rd Generation Partnership Project (3GPP), Mobile Competence Centre; 650, Route Des Lucioles; F-06921 Sophia-Antipolis Cedex; France, vol. RAN WG2, No. Kansas City, USA, Apr. 29, 2008, Apr. 29.

Panasonic: "MAC Flow Control and Related , Signal 1ing", 3GPP Draft; R2-074147_UE_Flow Control, 3rd , Generation Partnership Project (3GPP), , Mobile Competence Centre ; 650, Route Des , Lucioles ; F-06921 Sophia-Antipolis Cedex , ; France , , vol. RAN WG.

Qualcomm Europe, et al., "DL Flow Control in LTE", 3GPP TSG-RAN WG2 #61, 3GPP, R2-081062, pp. 1-4, Feb. 15, 2008.

Taiwan Search Report—TW099118585—TIPO—May 30, 2013.

3GPP: "3GPP TS 36.321 V8.2.0 (May 2008); 3rd Generation Partnership Project; Technical Specification Group Radio Access Network; Evolved Universal Terrestrial Radio Access (E-UTRA) Medium Access Control (MAC) protcol specification (Release 8)" 3rd Generation Partnerrship Project (3GPP); Technicalspecification (TS), XX, XX, No. TS 36.321 V8.2.0, May 1, 2008 (May 1, 2008), pp. 1-33, XP002554062.

* cited by examiner

SYSTEMS AND METHODS TO PROVIDE FLOW CONTROL FOR MOBILE DEVICES

CROSS-REFERENCE TO RELATED APPLICATIONS

This application claims the benefit pursuant to 35 U.S.C. 119(e) of U.S. Provisional Application No. 61/185,049, filed Jun. 8, 2009, and incorporated by reference herein in its entirety.

BACKGROUND

I. Field

The following description relates generally to wireless communication systems, and more particularly to providing flow control for a mobile device.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Advanced LTE systems (LTE-A), and orthogonal frequency division multiple access (OFDMA) systems.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Advanced LTE systems (LTE-A), and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

For current LTE systems there exists no protocol or methodology to flow control the base station or network (NW) side. However, flow control may be required in a plurality of scenarios, such as when the mobile device or user equipment (UE) is not able to process high data rates (e.g., when user applications or tasks are running on the UE and are running out of memory). Present solutions typically address such scenarios by blindly dropping the transport blocks or Radio Link Control (RLC) Protocol Data Units (PDUs) received on the downlink (DL) (as if the RLC PDUs were never received) or selectively dropping media access control (MAC) Service Data Units (SDUs) based on the priority or Quality of Service (QOS) or Radio Bearer (RB) type (whether DRB or SRB) and then relying on RLC level re-transmissions later. Unfortunately, such conventional methods cause inefficiencies and wastage of over the air bandwidth and potentially extra transmission power on the DL side.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems, methods, and apparatuses are disclosed to facilitate wireless communications. In one embodiment, a user communications apparatus, such as user equipment (UE) or mobile device, identifies data congestion and transmits a recommended data rate modification wireless signal (e.g., a recommended reduced data rate) to the base station that is transmitting data to the UE. The base station may reduce the data rate of the down link (DL) to the reduced data rate. The UE may then receive data from the base station at the reduced data rate. Therefore, flow control may be implemented at the base station side (e.g., sometimes referred to as the Network (NW) side) based upon the reduced data rate modification determined and transmitted by the UE to the base station. In this way, the data rate transmission to the UE can be reduced to allow the UE to successfully process received data and successfully perform its functions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
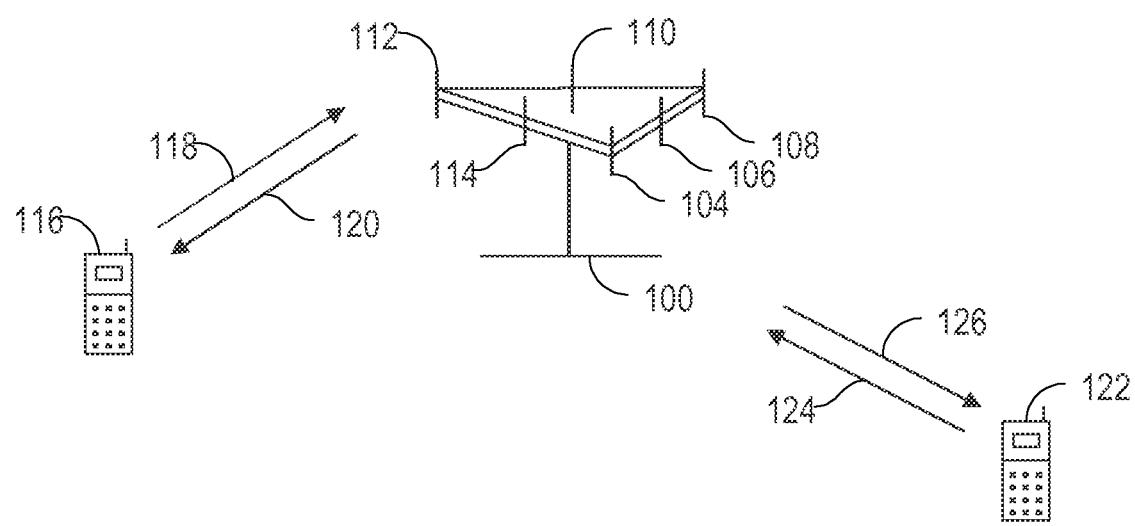
FIG. 1 is a diagram that illustrates a multiple access wireless communication system.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, a Node B, an evolved node B-eNB, serving eNB, target eNB, a femto station, femto cell, or femto node, a pico station, pico cell, or some other terminology. An access terminal may also be called a mobile device, user equipment (UE), a wireless communication device, a user communications apparatus, a terminal, or some other terminology.

Figure 2:
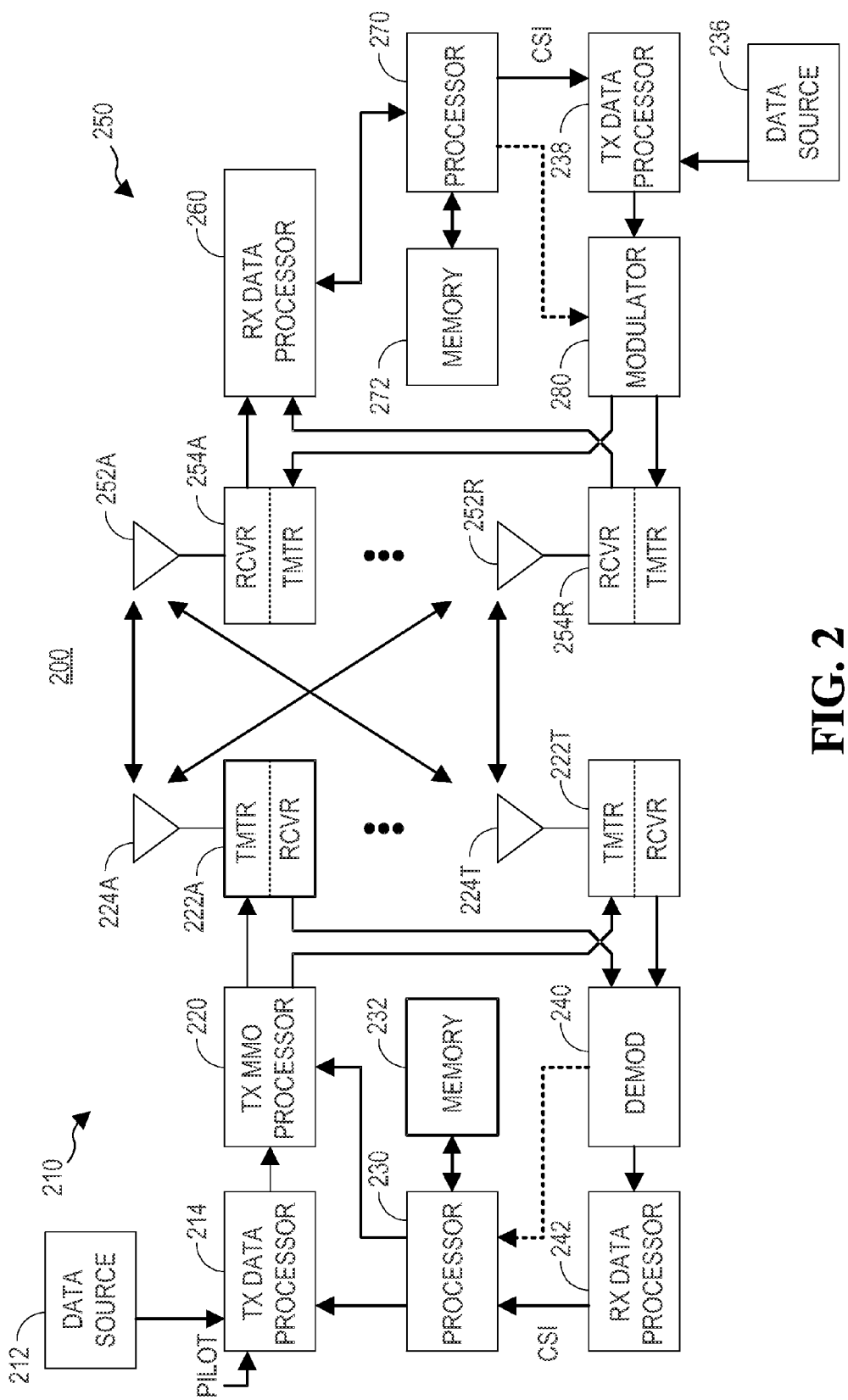
FIG. 2 is a block diagram of a communication system.

FIG. 2 is a block diagram of an embodiment of a transmitter system 210 (also known as the access point (AP), base station, etc.) and a receiver system 250 (also known as access terminal, user equipment (UE), mobile device, etc.) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) is a Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure may be provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access Channel
FC Flow Control
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic Channel
TCP Transfer Control Protocol
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel
NW Network
RB Radio Bearer
DRB Data Radio Bearer
SRB Signaling Radio Bearer
CE Control element
DL Downlink
QOS Quality of Service As will be described, systems, methods, and apparatuses are disclosed to facilitate wireless communications. In one embodiment, user equipment (UE), such as a mobile device, identifies data congestion and transmits a recommended data rate modification wireless signal (e.g., a recommended reduced data rate) to the base station that is transmitting data to the UE. The base station may reduce the data rate of the down link DL to the reduced data rate. The UE may then receive data from the base station at the reduced data rate. Therefore, flow control may be implemented at the base station side (e.g., sometimes referred to as the Network (NW) side) based upon the reduced data rate modification determined and transmitted by the UE to the base station. In this way, the data rate transmission to the UE can be reduced to allow the UE to successfully process received data and successfully perform its functions.

Figure 3:
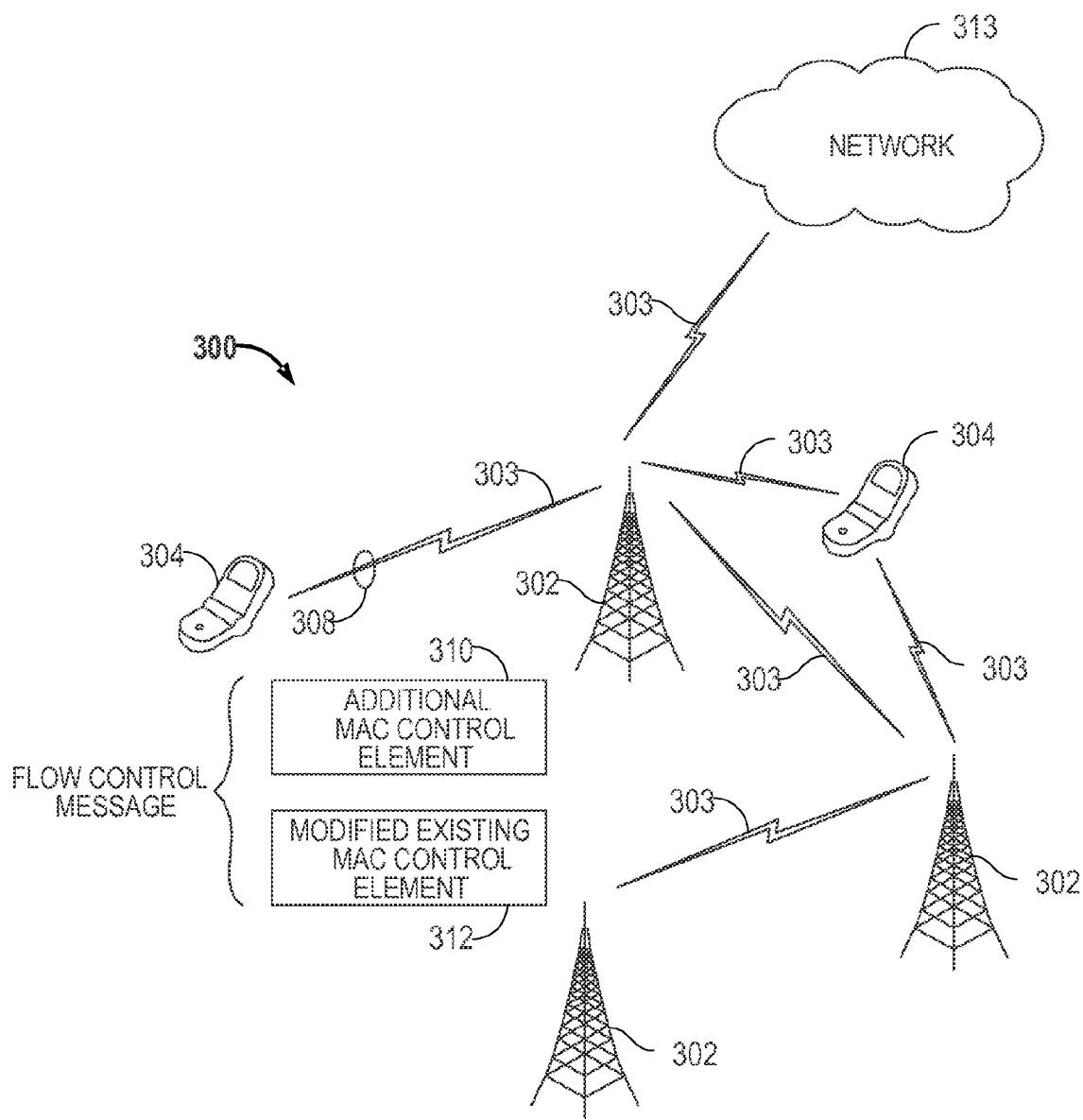
FIG. 3 is a diagram that illustrates a wireless communication system that enables a UE to notify a base station regarding congestion difficulties at the UE and to provide mitigation thereof.

Referring to FIG. 3, a wireless communication system 300 according to one embodiment is illustrated. Wireless communication system 300 may comprise one or more base stations 302 in one or more sectors that receive, transmit, repeat, and so forth, wireless communication signals 303 to each other and/or to one or more mobile devices or UEs 304 and/or to a network 313.

Network 313 may be other wireless networks such as a wireless local area network (WLAN), a wireless personal area network (WPAN) and/or a wireless home-network, as well as other types of wireless networks and/or a wired network such as networks based on Powerline Communication (PLC) or the standard Ethernet networks (e.g. a local area network (LAN), or a wide area network (WAN), the Internet, etc.), which is packetized, packet-switched, connection oriented, etc., type network that can utilize Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. For example, a computer network 313 may allow the communication of data traffic between server(s) and computers using packets. As one example, network 313 may include a private corporate network that is accessible through the Internet 313 to a UE 304 via wireless communication signals 303. As another example, network 313 may include a music or video accessible server that is accessible via the Internet 313 to a UE 304 via wireless communication signals 303.

Each base station 302 may comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each UE 304 may comprise one or more transmitter chains and receiver chains, which can be utilized for a multiple input multiple output (MIMO) system. Moreover, each transmitter and receiver chain may comprise a plurality of components associated with signal transmission and reception (e.g., processors, modulators, multiplexers, demodulators, demultiplexers, antennas, and so on), as will be appreciated by one skilled in the art.

As illustrated in FIG. 3 a flow control message 308 in wireless signal 303 may be provided, in which the message may be sent from a UE 304 to a base station 302 (e.g., a Node B, an evolved Node B (eNB), etc.) that advises the base station 302 to reduce the rate of data transmission in the DL.

As one example, the flow control message 308 may include an additional MAC Control Element 310 (e.g., a MAC CONTROL PDU) as part of the MAC protocol such that the associated flow control message 308 may introduce a new/additional MAC control element 310 to indicate a new recommended (e.g., reduced) data rate. As another example, an existing MAC control element 312 (e.g. a MAC CONTROL PDU) may be modified to indicate a desired recommended (e.g., reduced) data rate.

As previously described in FIG. 2, both the base station 210 and the UE 250 include processors that execute instructions and memories that retain instructions to receive, transmit, demodulate, and process signals and data, etc. As will be described hereinafter, in one embodiment, the UE 304 and the base station 302 under the control of their respective processors implement instructions stored by their respective memories (as described in FIG. 2) such that: the UE 304 identifies data congestion; the UE 304 transmits a recommended data rate modification wireless signal 303 (e.g., a reduced data rate) to the base station 302; the base station 302 reduces the data rate of the DL to the reduced data rate; and the UE 304 receives data from the base station 302 at the reduced data rate.

In one embodiment, an additional MAC control element 310 is used to indicate the recommended data rate. Additional MAC control elements may include one of the following: a new requested data rate; or a maximum transport block size; or a relative maximum transport block size; and optionally a flow control timer value. In another embodiment, an existing MAC control element 312 may be modified to indicate the recommended data rate. The modified MAC control element 312 may include: a new requested data rate; or a reduced maximum transport block size; or a relative maximum transport block size; and optionally a flow control timer value.

Figure 4:
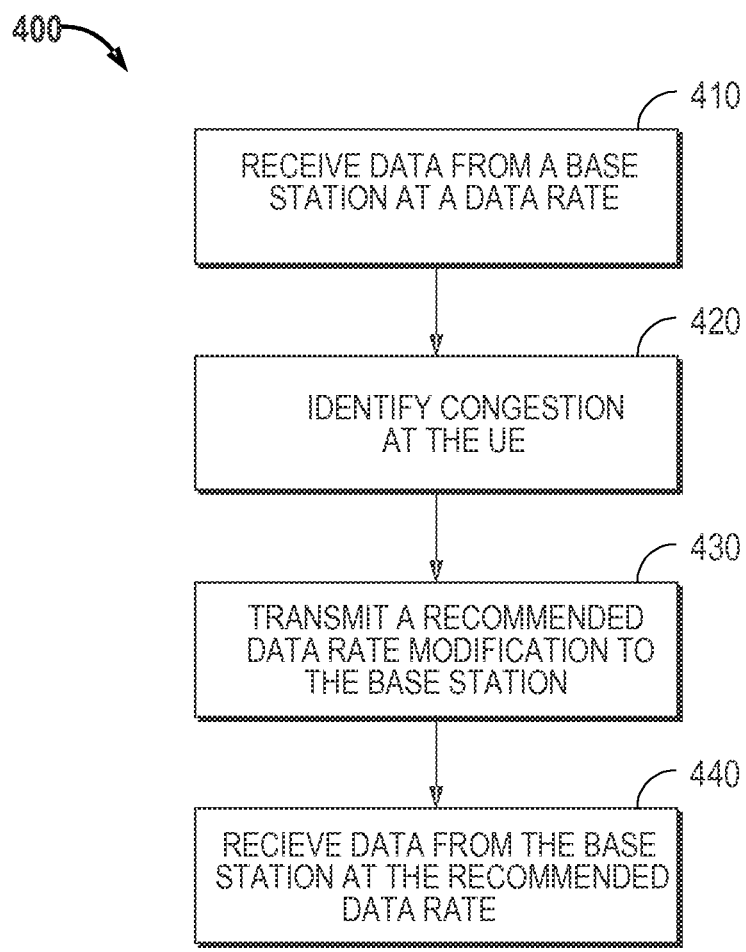
FIG. 4 is a flowchart that illustrates a method to implement flow control to reduce congestion at the UE.

With reference to FIG. 4, FIG. 4 is a flowchart that illustrates a related method 400 to implement flow control to reduce congestion at the UE, according to one embodiment. At block 410, data is received by the UE 304 from the base station 302 at a data rate. Next, at block 410 congestion is identified at the UE 304. A recommended data rate modification (determined by the UE 304) is sent as a wireless signal 303 by the UE 304 to the base station (block 430). The recommended data rate modification is typically a reduced data rate. The UE 304 then receives data from the base station 302 at the recommended data rate (e.g. reduced data rate) (block 440).

Therefore, in one embodiment, flow control occurs at the base station 302 side (e.g., sometimes referred to as the Network (NW) side or eNB side) based upon a reduced recommended data rate modification wireless signal 303 determined and transmitted by the UE 304. Thus, initially, congestion at UE 304 may be identified and a message may then be transmitted from the UE 304 to the base station 302 regarding such congestion. A data rate modification/reduction rate is thereby suggested to the base station 302. The UE 304 may then receive data at the reduced rate from the base station 302 via the DL.

Figure 5:
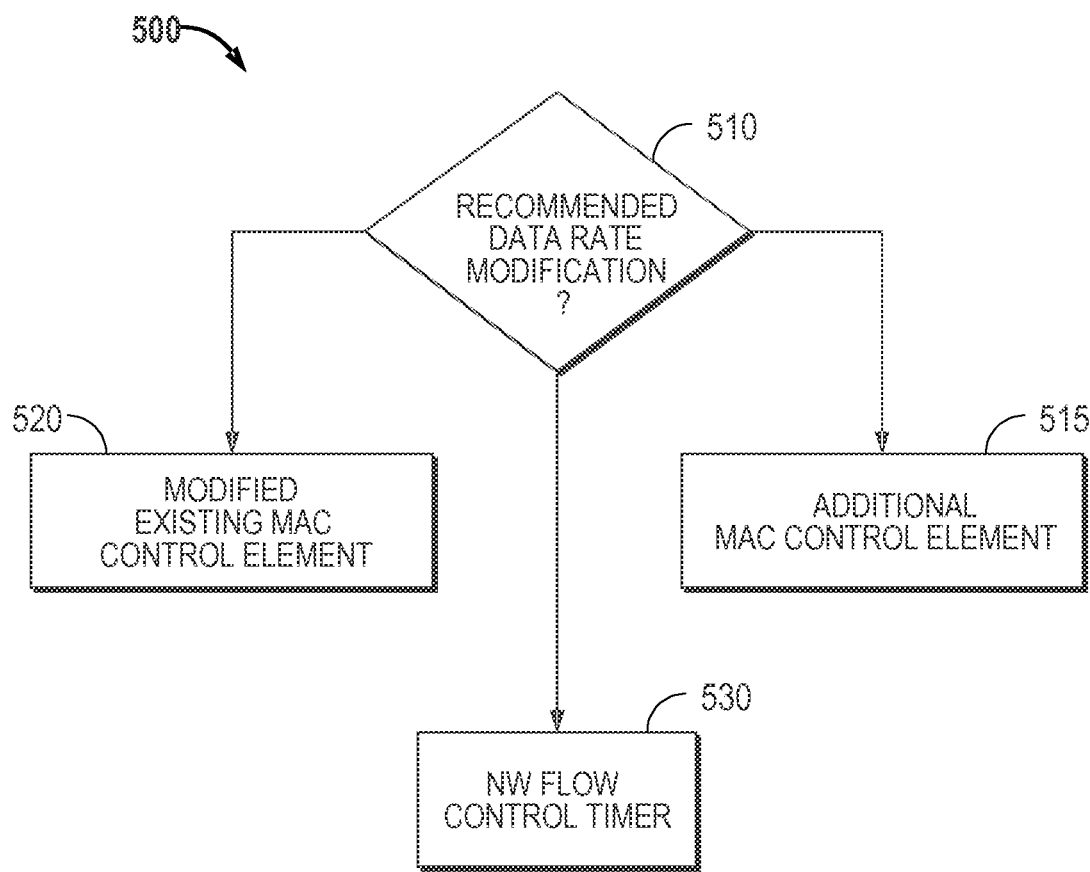
FIG. 5 is a flowchart that illustrates a method to select different types of recommended data rate modifications.

With reference to FIG. 5, FIG. 5 is a flowchart that illustrates a related method 500 to select different types of recommended data rate modifications, according to one embodiment. At decision block 510, a recommended data rate modification is selected by the UE 304. As will be described in detail hereinafter, an additional MAC control element 310 may be selected (block 515), an existing MAC control element 312 may be modified (block 520), or a NW flow control time may be utilized (block 530).

Thus, embodiments of the invention allow the UE 304 to notify a base station 302 (e.g., an eNB) about congestion difficulties that the UE is experiencing. For example, the UE 304 may not be able to process data from a DL. The UE 304 may request that the base station 302 modify the rate of data transfer to address such congestion. Therefore, a recommended data rate modification message signal 303 may be wirelessly transmitted from the UE 304 to the base station 302 to request that the base station reduce the rate of data transmission in the DL. In this way, the reduction of data transmission can further mitigate the loss of associated data packets. The recommended data rate modification message signal 303 may include an additional MAC control element 310 as part of the MAC protocol such that the associated flow control message 308 may introduce a new additional MAC control element 310 (e.g., a MAC control PDU). Alternatively, an existing MAC control element 312 may be modified.

In the current 3GPP specification there is not a protocol or methodology to flow control the network (NW) side (e.g., the base station 302). Yet, flow control may be desirable in a plurality of scenarios, such as when the UE 304 is not able to process higher data rates (e.g., when user applications or tasks running on the UE are running out of memory). Unfortunately, current conventional techniques typically address such scenarios by blindly dropping the transport blocks or RLC PDUs received on DL (as if the RLC PDUs were never received) or selectively dropping MAC SDUs based on the priority or QOS or RB type (whether DRB or SRB) and then rely on RLC level re-transmissions later. Such conventional methods cause poor user experience, inefficiencies and wastage of over the air bandwidth and potentially extra transmission power on the DL side.

In one embodiment, such issues are addressed by defining a new additional MAC control element 310 between the 304 UE and the base station 302 to flow control on the NW side. Such an innovation may define the possible contents of the additional MAC control element 310 (e.g. a MAC CONTROL PDU) and also define possible NW handling on receipt of additional MAC control element 310.

Various advantages of the additional MAC control element 310 according to the subject innovation are: 1) Processing needed to send a MAC control PDU is minimal such that it may be effective when the UE 304 is running out of processing MIPS; 2) The additional MAC control element 310 may indicate a maximum transport block size that the UE 304 can possibly process on the DL, which may ensure that high priority data is not blocked; 3) Modifying an existing MAC control PDU 312 such as the power headroom CE, buffer status report CE, etc., may be provided to indicate that base station 304 (e.g., the NW) should implement flow control; 4) A fast way to communicate to the base station 302 that flow control on the DL is needed and support for the early resumption from flow control state if needed; 5) An un-necessary power control algorithm does not need to be implemented that may potentially result in the base station 302 increasing the power of DL transmission because of extra RLC packet errors or HARQ packet errors perceived by the NW if the UE 304 implements a selective dropping approach.

Figure 6:
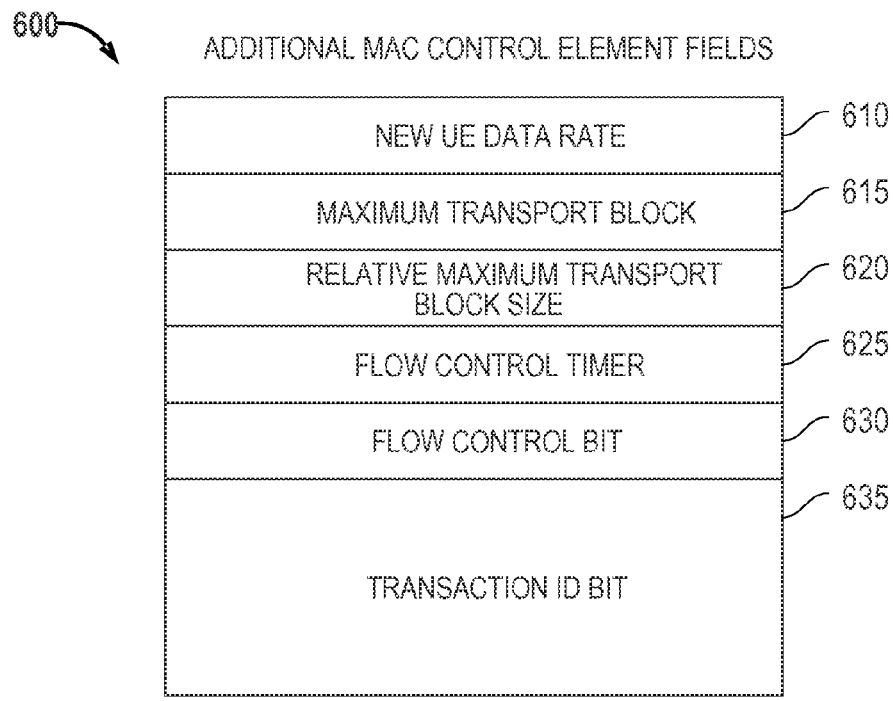
FIG. 6 is a diagram that illustrates an example of additional MAC control element fields.

With reference to FIG. 6, an example of additional MAC control element fields 600 is illustrated. In this example, the additional MAC control element may include a plurality of different fields to implement a recommended or reduced data rate. The MAC control element fields may contain the following fields: a new UE data rate field 610; a maximum transport block size field 615; a relative maximum transport block size field 620; a flow control timer value field 625; a flow control bit field 630 to control application of the flow control timer value; and a transaction ID bit field 635.

The additional MAC control element fields 600 may include:

1) The new UE data rate field 610 that may indicate a new recommended or reduced data rate to transport data from the base station 302 to the UE 304;
2) The maximum transport block size field 615 that may indicate a maximum transport block size that the UE 304 may receive on the DL from the base station 302;
3) The relative maximum transport block size field 620 that may indicate a relative maximum transport block size (e.g., 0, ½, ¼, ⅛, 1/16, . . . , 1) wherein: 0 may refer to only transmitting SRB data and/or VoIP data on the DL from the base station 302 to the UE 304; a non-zero value may indicate a percentage of maximum transport block size that the UE 304 may support as per UE category; and 1 may indicate that the UE 304 may only process the maximum transport block size that the UE can support as per UE category;

4) The flow control timer value field 625 (or Expiry timer) that may provide an enumerated timer value (e.g., 10 ms mapped to value 1, 20 ms mapped to value 2, . . . etc.) which may be used to indicate the timer value until the base station 302 should not send new transport blocks greater than the size corresponding to: 1) or 2) or 3). However, if this field is not present or its value is set to 0 then it indicates that the base station should: 1) or 2) or 3) until the base station receives a resume indicator bits [5) below] from the UE 304;

5) The flow control bit field 630 (or Resume Indicator Bit) to control application of the flow control timer value wherein this bit may be used to stop the ongoing timer at the base station 302 and to resume it with default UE 304 capability transport block transmission. Thus, this bit may be used to indicate that the UE 304 is back to normal mode and ready to accept maximum transport blocks as per UE category. However, if the Resume Indicator Bit is not set then this may imply that the base station 302 should perform the FC on the DL based on other parameters. It should be noted that the Resume Indicator Bit implementation is opposite to that of the Flow Control Bit value; and 6) The transaction ID bit field 635 may be an optional bit(s). This bit(s) may be used by the peer side base station 302 (e.g., NW) to identify duplicate control messages in case of quick repeats from the source side (e.g., UE 304). The UE 304 may be expected to keep it the same for quick repeats of the additional MAC control element (CE) 310 and change it only if it has to send the MAC CE again after quick repeat or in case contents of the MAC CE is changed.

Similarly, on the base station 302 or NW side, the following handling may be implemented:

1) Whenever the base station 302 receives the MAC control PDU with flow control bit 630 set then the base station 302 should limit the new transport block size as per either of the alternatives above;

2) Whenever the base station 302 receives an additional MAC CE 310 with the flow control bit 630 (or resume indicator) set then the base station 302 should start the timer (if indicated) and continue limiting transport size as per 1). If the timer is already running then the base station 302 may or may not re-start the timer (something that may be specified in a specification);

3) If the timer was started and it expires then the base station 302 should resume the normal transmission;

4) If the timer was not started then the base station 302 should resumes normal transmission when it receives the additional MAC CE 310 with the "resume indicator" 630 bit set or with relative maximum transport block size 620 set to 1;

5) The base station 302 should stop the timer and resume normal transmission whenever the "resume indicator" 630 is received or whenever the relative maximum transport block size 620 set to 1 is received; and 6) If the transaction id bit field 635 (if present) is received in the additional MAC CE 310 and it is same as the one which triggered the base station 302 to start the timer (if already running) then the additional MAC CE 310 should be ignored, otherwise, this may be considered as a new additional MAC CE 310 and the timer should be re-started (if already running)

It should be appreciated that the additional MAC control element 310 (e.g., implemented as a control PDU) may be sent periodically, wherein the periodicity of the control element when the flow control bit 630 is set to 1 may be different than when it is set to 0. It should further be appreciated that such implementation may be configurable through RRC signaling or statically defined in standards. Advantages of a timer approach (in the absence of periodic MAC CE reports) is that it may save the UE 304 from the condition when the base station 302 is stuck to the flow control state in the case it did not receive the MAC CE 310 with flow control reset indicator.

Figure 7:
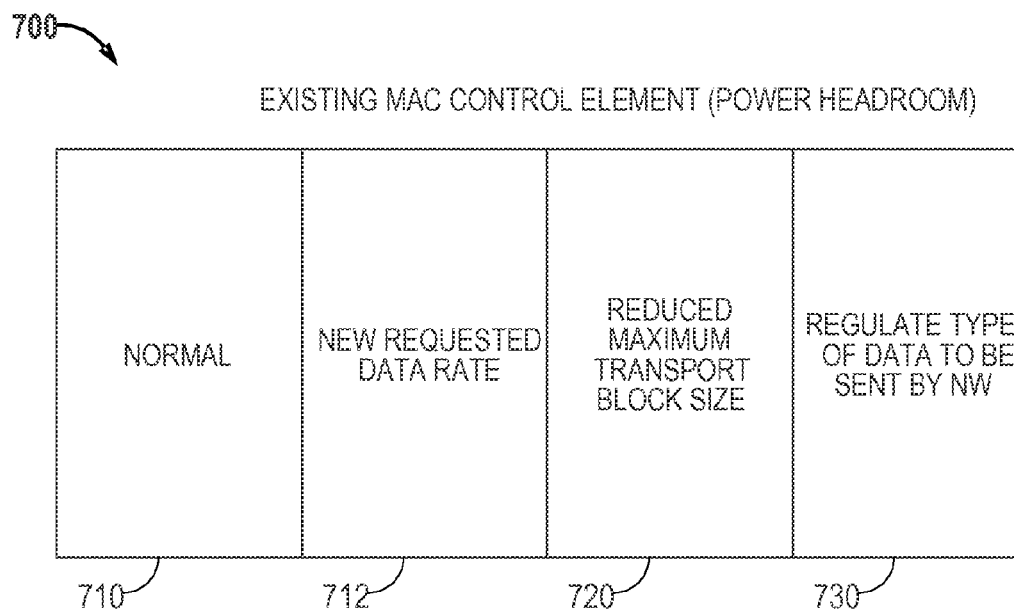
FIG. 7 is a diagram that illustrates an example of MAC control element fields that may be modified.

In an alternative embodiment, flow control may be implemented by modifying the existing MAC control element 312 (e.g., a MAC control PDU). With reference to FIG. 7, example MAC control element fields 700 that may be modified for the MAC control element 312 are illustrated. The MAC control element fields that may be modified may include the following fields: a normal field 710; a new requested data rate field 712 to indicate a new requested data rate; a reduced maximum transport block size field 720 to indicate a maximum transport block size; and regulate types of data field 730 to regulate the types of data to sent by the base station 302 to the UE 304. In one embodiment, the existing MAC control element 312 may be the power headroom control element.

By modifying an existing MAC control element 312, flow control indication and/or resumption may be modified with any of the existing MAC control PDUs. For example, by modifying the power headroom control element in which there are currently reserved 2 bits, a FC indication may be provided. The advantage of using the power headroom control element is that is sent periodically from the UE 304 and if an FC indication is clubbed with the existing MAC CE 312 then it may continuously indicate to the base station 302 the state of the UE 304. One exemplary method to define the 2 bits available in power headroom control element can be in form of:

0b00—UE State normal (field 710) and no FC trigger needed;

0b01—UE would like base station to reduce the max transport block size (field 720), for example, by ½ or ⅓ or ¼ or . . . (value has to be different than one corresponding to 0b10 or 0b11);

0b10—UE would like base station to reduce the max transport block size (field 720) by ½ or ⅓ or ¼ or . . . (value has to be different than one corresponding to 0b01 or 0b11); and 0b11—UE would like the base station to reduce the max transport block size (field 720) by ½ or ⅓ or ¼ or . . . (value has to be different than one corresponding to 0b01 or 0b10) . . . or this field may indicate to the base station that the base station should only send SRB data and/or VoIP data and should not send any other DRB data at all (field 730).

A further embodiment may enhance each of the alternatives discussed above. For example, the base station 302 may impose restrictions on when and/or how frequent the flow control MAC CE (310, 312) may be sent. For example, the base station 302 may introduce a simple flow control prohibit timer. The timer may started whenever the UE 304 transmits a flow control MAC CE (310, 312) and when the timer is running and the UE 304 is not allowed to send another flow control MAC CE to the base station 302 until the timer expires (e.g., subject to exceptions below). Such a timer may be configured by RRC during call set up or handover, or it can be hardcoded into the standard as a fixed timer to avoid extra signaling. Such a timer may be applied to the two alternative options discussed above such as an additional mechanism to limit the UE 304 from sending the flow control MAC CE to frequently. This provides control to the base station 302 to prevent the UE 304 from abusing flow control e.g., by threshing the base station 302 with flow control MAC CE's. As an example, such a timer may be started on receipt of HARQ-ACK on which the MAC CE was transmitted.

In accordance with another embodiment, a Flow Control Prohibit Timer with Exceptions may be provided. In addition to the flow control prohibit timer discussed previously, the base station 302 may also implement the following exceptions to increase the performance of flow control when a prohibit timer is used:

When the flow control prohibit timer is running, the UE 304 may be allowed to send a flow control MAC CE 310 if the MAC CE 310 contains a "Resume Indicator Bit" set (or similar info). This allows the base station 302 to resume normal transmission quickly without waiting for the flow control prohibit timer to expire and the UE 304 to send a MAC CE 310. The base station 302 may be expected to stop the flow control timer (if running) on receipt of MAC CE 310 with the "Resume Indicator Bit";

When the flow control prohibit timer is running, the UE 304 may be allowed to send a flow control MAC CE 310 if the new flow control MAC CE 310 requests the base station 302 to lower or higher the data rate to a level that is lower or higher than what was requested by the last effective flow control MAC CE 310. This enables the UE 304 to request lower or higher DL data rates without waiting for the flow control prohibit timer to expire. In addition, this is beneficial because, for example, in case the UE 304 did not ask for enough rate reduction in the previous flow control MAC CE 310, it can still ask for more data rate reduction quickly without waiting for the prohibit timer to expire; and On receipt of HARQ failure on which this MAC CE 310 was transmitted, the UE 304 may choose to re-transmit a flow control MAC CE 310.

According to a further embodiment, a selective discard may also be implemented. For example, if there is a need to flow control the UE 304 then a UE MAC or RLC may selectively drop the data received on a given logical channel. Such selection may be performed based upon the priority of the logical channel or the logical channel group or RB Type (e.g., SRB or DRB). Further for RLC packets within a RB, the UE 304 may drop packets in a probabilistic manner similar to Active Queue Management (AQM). Likewise, if such dropping of packets is based on RB type then all the data received over the SRB may be processed whereas DRB data may be dropped either at MAC or RLC level. One advantage of such aspect is that no change in standard is required to flow control the DL.

Thus, embodiments of this innovation offer a mechanism to provide flow control that occurs at the base station 302 side (e.g., sometimes referred to as the Network (NW) side or eNB side) based upon a reduced recommended data rate modification wireless signal 303 determined and transmitted by the UE 304. In particular, a flow control message 308 may be sent from a UE 304 to the base station 302 (e.g., a Node B, an evolved Node B (eNB), etc.) that advises the base station 302 to reduce the rate of data transmission in the DL. As one example, the flow control message 308 may include an additional MAC Control Element 310 (e.g., a MAC CONTROL PDU) as part of the MAC protocol such that the associated flow control message 308 may introduce a new/additional MAC control element 310 to indicate a new recommended (e.g., reduced) data rate. As another example, an existing MAC control element 312 (e.g. a MAC CONTROL PDU) may be modified to indicate a desired recommended (e.g., reduced) data rate. Accordingly, congestion at UE 304 may be identified and a message may then be transmitted from the UE 304 to the base station 302 regarding such congestion. A data rate modification/reduction rate is thereby suggested to the base station 302. The UE 304 may then receive data at the reduced rate from the base station 302 via the DL.

This innovation is advantageous because UEs 304 support multimedia and many different applications that run concurrently (e.g., email, video, voice, web browsing, etc.). Each application demands certain amount of resources from the UE 304 (e.g., processing power, buffers, battery power, etc.). The total amount of instantaneous resources varies dynamically over time. However, to keep the cost of the UE 304 reasonable, the UE is typically designed to handle the most common load conditions rather than the peak instantaneous resource requirement, which may be significantly larger than the common load. It should be appreciated that the peak instantaneous resource requirement by definition should include but is not limited to resources needed simultaneously for receiving MBMS, transmitting at the peak UL rate, receiving at the peak DL rate, running processor intensive user applications, etc. Therefore, the UE 304 may be subject to run low in resources during some difficult scenarios. The following are some non-exhaustive examples:

UE receiving MBMS service while downloading file using ftp;

Applications cannot consume DL packets fast enough so the DL buffer in the UE keeps building up;

Application processor cannot consume DL packets from processor fast enough so the buffer between them keeps building up;

Any concurrent transmission and reception at peak rates such as receiving at DL peak rate while transmitting at UL peak rate; and Multiple user applications competing for resources (MIPS, data bus, etc.) in the UE.

Unfortunately, under these examples, the UE may start dropping packets that it cannot handle. Examples may include:

UE keeps discarding DL packets that it cannot handle;

Base station keeps transmitting and retransmitting packets that will eventually be dropped at the UE. Radio resources will be wasted;

If the packets are dropped at the MAC layer at the UE, the base station will keep retransmitting those packets in RLC. Since retransmitted RLC packets are dropped as well at the UE, the base station may conclude there is a problem in RLC and trigger an intra-base station handover, which would create service interruptions;

TCP times out, TCP window collapses, and TCP slow start will occur;

Higher layer applications may time-out while TCP is trying to recover;

User sees a very slow to dead radio link and big swing of throughput due to TCP congestion control (as will be shown in simulation results provided in FIGS. 8-10); and Since these low resource events are random and sporadic and cannot be previously known, and it takes time for TCP to react, a user will experience very low average throughput and excessive delay of the packets.

However, if the flow control embodiments of the subjection innovation are implemented, the UE 304 may inform the base station 302 about the congestion occurring at the UE 304 and a new recommended reduced data rate that can be implemented by the UE 304. Based upon this, the base station 302 can modulate the DL traffic (e.g., non-GBR high rate traffic) properly to avoid TCP timeout, keep the traffic flowing smoothly but at a reduced rate, and allow time for TCP to adjust to the lowered rate gracefully. Further, Active Queue Management (AQM) at the base station 302 may be activated if the condition does not improve after some time (e.g., as opposed to the UE 304 merely randomly dropping packets).

Accordingly, utilizing the flow control embodiments of the subjection innovation, in general, radio resource may not be wasted and the user may see reduced but much smoother throughput. Moreover, the DL flow control of the subject innovation offers the following benefits: Flexibility for UE 304 implementation and hence cost reduction (e.g., the UE 304 could share certain resources among applications to achieve "multiplexing gain"); Better "good" throughput, since the network should not allocate more bandwidth to the UE 304 than it can consume which improves the efficiency of the radio resources; The base station 302 may be allowed to trigger AQM if modulating the DL packets temporarily does not improve the situation; The UE 304 may be protected under certain overload scenarios; An efficient means for the UE 304 to cope with high peak data rate to average data rate ratio without over-dimensioning the UE 304 may be provided; Better user experience due to lower UE response times (e.g., user application launches faster) and, when applications are being launched, the UE 304 may activate flow control to reduce the best-effort flow temporarily.

Moreover, various aspects of flow control according to the subject innovation can be implemented with the following exemplary procedures to avoid abuse: Flow control may be activated on an as needed basis; Flow control may not be used by the UE 304 to claim the support of a data rate that the UE 304 cannot realistically sustain; Flow control may be used for relief to the UE 304 from instantaneous and temporary resource starvation.

In one embodiment, the previously-described flow control mechanism may be implemented in the order of tens of millisecond (ms) to bring immediate relief to UE 304 when the resources run low. As previously described, the UE 304 may send an additional MAC control element 310 (e.g., a MAC Flow Control PDU) to indicate the maximum Transport Block (TB) size that the UE 304 can support as a fraction of the maximum TB size indicated in the UE capability. For example, the UE 304 may indicate a TB Size Factor e.g., 0.2, which indicates that the UE 304 may only typically support TB sizes no larger than (0.2× maximum TB size as indicated by the UE capability). As on particular example, TB Size Factor 0 may indicate that the UE cannot process traffic from non-GBR DRBs but may still process traffic from SRBs.

In particular, in one embodiment, the additional MAC control element 310 may implemented by the following change to the MAC specification:

TABLE 1

Values of LCID for UL-SCH

| Index | LCID values |
|---|---|
| 00000 | CCCH |
| 00001-01010 | Identity of the logical channel |
| 01011-11000 | Reserved |
| 11001 | Flow Control Request |
| 11010 | Power Headroom Report |
| 11011 | C-RNTI |
| 11100 | Truncated BSR |
| 11101 | Short BSR |
| 11110 | Long BSR |
| 11111 | Padding |

Flow Control MAC Control Element

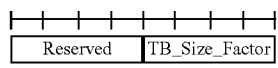

TABLE 2

Values of TB_Size_Factor

| Index | TB Size Factor |
|---|---|
| 0000 | 0 |
| 0001 | 0.1 |
| 0010 | 0.2 |
| 0011 | 0.3 |
| 0100 | 0.4 |
| 0101 | 0.5 |
| 0110 | 0.6 |
| 0111 | 0.7 |
| 1000 | 0.8 |
| 1001 | 0.9 |
| 1010 | 1.0 |
| 1011-1111 | Reserved |

In this example, the additional MAC control element 310 is implemented, as shown in Table 1: "Values of LCID [local identifier] for UL-SCH [Up-link Shared Channel]", as: bolded index 11001 and bolded LCID value: "Flow Control Request" having a "Reserved" portion and a "TB_Size_Factor" portion. Table 2 shows the values of the TB size factors and their corresponding indexes. The triggers for this additional MAC control element 310 are implementation dependent. In this example, when the base station 302 receives this additional MAC control element 310, the base station 302 may reduce the DL traffic and the designated the logical channel(s). For example, the base station 302 may choose to reduce the DL traffic of a best-effort type (non-GBR). This may be used to preserve the QoS model wherein the base station 302 controls the QoS for individual logical channels.

This implementation technique includes many advantages. For example, in order to implement this technique only minor functions are needed: an LCID value is reserved, an additional MAC control element 310 is defined, and an SR trigger for the additional MAC control element is defined. Because the base station 302 scheduler needs to decide on a TB size anyway, the base station 302 merely needs to implement one more step to limit the TB size to whatever the UE 304 indicates such that there are very little changes or complexity required by the base station.

Further, this technique of flow control by the UE 304 provides fine granularity because the UE 304 may particularly indicate the data rate reduction needed in the additional MAC control element 310. This fine granularity should help improve TCP performance. Additionally, because the UE 304 merely transmits the additional MAC control element 310 when needed, minimal overhead is required. Moreover, the base station 302 has control over which radio bearers reduce the DL data rate (including but not limited to RLC-AM flows, RLC-UM flows, MBMS, etc.) and the QoS can be completely controlled by the base station 302. Also, the base station 302 may reduce both RLC new transmissions and retransmissions such that substantially little efforts are needed for standardization because many of the procedures are already implemented by the base station 302.

Figure 8:
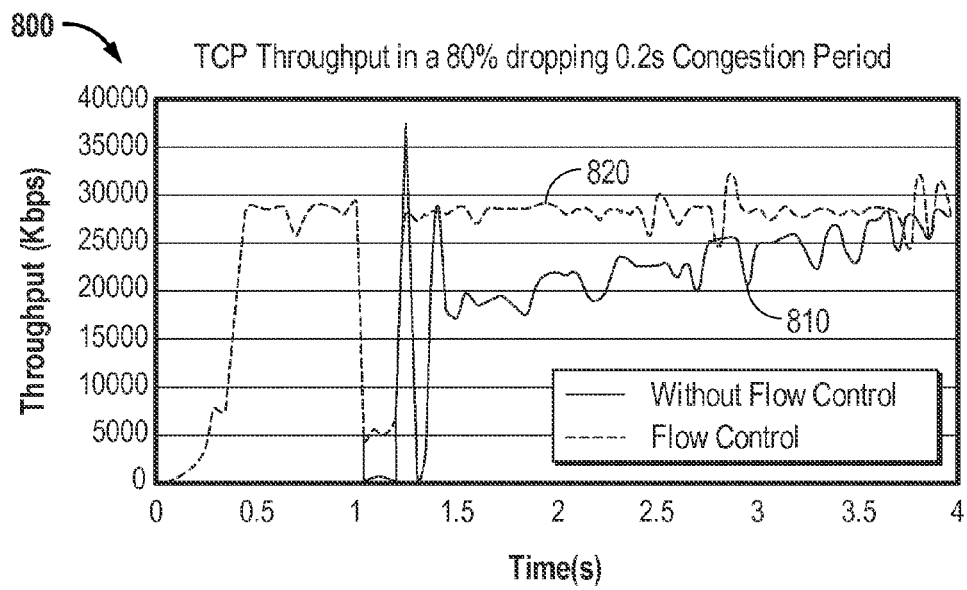
FIG. 8 is a chart that illustrates the impact to TCP throughput utilizing the flow control methodology.

Various simulations results are hereinafter described to illustrate the advantages of the previously-described flow control methodology. With reference to FIG. 8, FIG. 8 illustrates a chart 800 showing the impact to TCP throughput utilizing the flow control methodology. The y-axis represents Throughput in Kbps and the x-axis represents time in seconds. Various performance metrics are shown in FIG. 8 with and without flow control for easy comparison. In particular, line 810 shows Throughput without the previously-described flow control methodology and line 820 shows Throughput utilizing the previously-described flow control methodology. As can be seen in FIG. 8, a 200 ms congestion occurs starting at time 1.0 s. FIG. 8 shows that without flow control (line 810), TCP times out and enters a slow-start phase in which the throughput recovers slowly. However, utilizing the flow control methodology, as shown by line 820, the TCP throughput is only reduced for a short period of time, and once the congestion is over, the throughput goes back to its normal level quickly and TCP does not time out.

Figure 9:
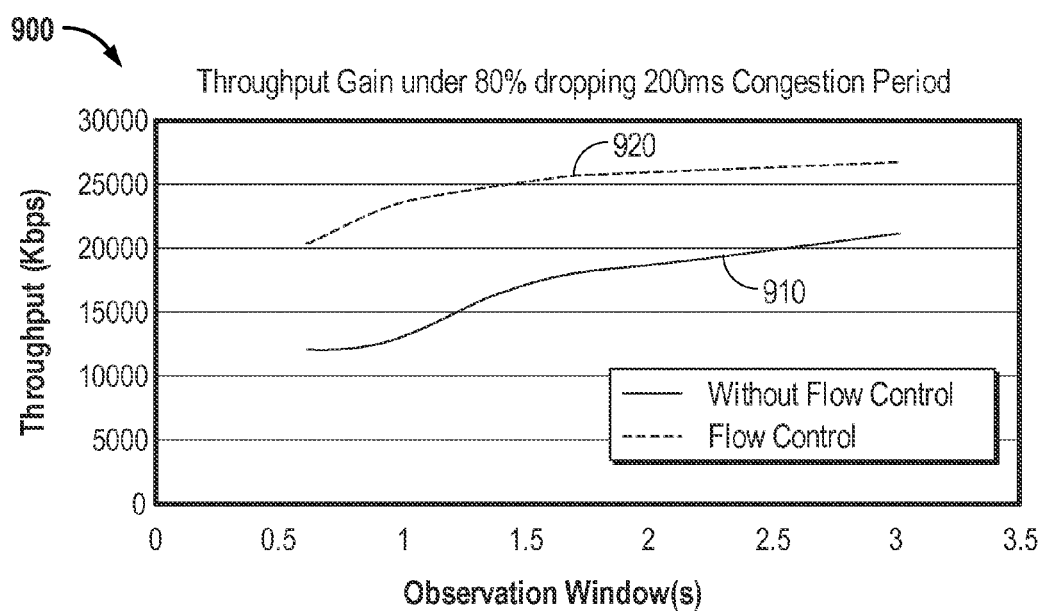
FIG. 9 is a chart that illustrates the average TCP throughput averaged over an observation window of recovery time during a congestion period.

With reference to FIG. 9, FIG. 9 is a chart 900 illustrating the average TCP throughput averaged over an observation window of recovery time during the congestion period. During this recovery time, as shown in FIG. 9, the "percentage drop" without flow control, as shown by line 910, varies greatly whereas the "percentage drop" with flow control, as shown by line 920, varies significantly less.

Figure 10:
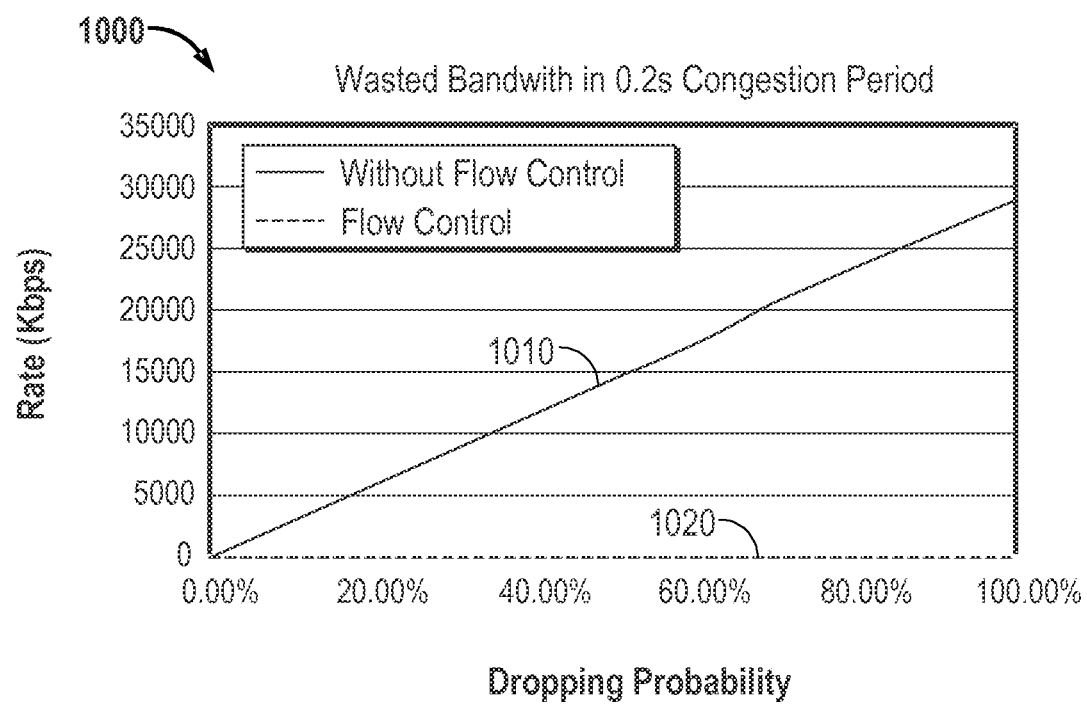
FIG. 10 is chart that illustrates wasted bandwidth over the congestion period.

With reference to FIG. 10, FIG. 10 is chart 1000 illustrating wasted bandwidth over the 0.2 second congestion period. The y-axis represents rate in Kbps and the x-axis represents dropping probability. In particular, FIG. 10 illustrates inefficient over-the-air bandwidth during congestion versus the probability of dropping. As can be seen, line 1010, without flow control, shows greatly increasing wasted inefficient over-the-air bandwidth whereas line 1020, with flow control, does not.

In one configuration, as previously described, the UE 304 operable in a wireless communication system 300 may include: means for receiving data from the base station 302 at a data rate; means for identifying congestion; means for transmitting a recommended data rate modification wireless signal 308 to the base station 302; and means for receiving data from the base station at the recommended data rate. In one aspect, the aforementioned means may be the processor(s) (238, 260, and 270) of the UE 250, 304 and the processor(s) (220, 230, and 242) of the base station 210, 302 in which the invention resides from (FIGS. 2 and 3) as configured to perform the functions recited by the aforementioned means. Further, the UE 250, 304 and base station 210, 302 may be used to perform all of previously described means for performing the previously described functions. In another aspect, the aforementioned means may be a module or any apparatus configured to perform the functions recited by the aforementioned means.

It is noted that various aspects are described herein in connection with a user terminal, a user device, user equipment (UE), etc., all of which terms may be used interchangeably. User equipment can also be referred to as a system, a subscriber unit, subscriber station, mobile station, mobile device, remote station, remote terminal, access terminal, user terminal, user agent, etc. User equipment may be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Those of skill in the art should understand that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Further, those of skill in the art should understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill should further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Further, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

What is claimed is:

1. A user communications apparatus operable in a wireless communication system, the user communications apparatus comprising:
a processor;
a memory in electronic communication with the processor; and
instructions stored in the memory and operable, when executed by the processor, to cause the user communications apparatus to:
receive data from a base station via a downlink at a data rate;
identify data congestion at the user communications apparatus, wherein the data congestion is based at least in part on an ability of the user communications apparatus to process data received at the data rate for the downlink;
determine, by the user communications apparatus, a reduced data rate for the downlink and a time period for using the reduced data rate based at least in part on the identified data congestion;
transmit, to the base station, a wireless signal comprising a medium access control control element that indicates the reduced data rate, wherein the medium access control control element comprises a flow control timer value that indicates the time period for using the reduced data rate for the downlink; and
receive data from the base station via the downlink at the reduced data rate.

2. The user communications apparatus of claim 1, wherein the medium access control control element is in addition to an existing set of medium access control control elements, and wherein the instructions are further executed by the processor to cause the user communications apparatus to:
incorporate the additional medium access control control element in the wireless signal to indicate the reduced data rate.

3. The user communications apparatus of claim 2, wherein the additional medium access control control element comprises a field to indicate a maximum transport block size.

4. The user communications apparatus of claim 2, wherein the additional medium access control control element comprises a field to indicate a relative maximum transport block size, and wherein the relative maximum transport block size indicates a percentage of a maximum transport block size that the user communications apparatus is able to support.

5. The user communications apparatus of claim 2, wherein the additional medium access control control element comprises a field to indicate the flow control timer value.

6. The user communications apparatus of claim 5, wherein the additional medium access control control element comprises a field to indicate a flow control bit to control application of the flow control timer value.

7. The user communications apparatus of claim 1, wherein the instructions are further executed by the processor to cause the user communications apparatus to:
modify an existing medium access control control element to indicate the reduced data rate.

8. The user communications apparatus of claim 7, wherein the existing medium access control control element comprises a field to indicate a reduced maximum transport block size.

9. The user communications apparatus of claim 7, wherein the existing medium access control control element comprises a field to regulate types of data to be sent by the base station to the user communications apparatus.

10. The user communications apparatus of claim 7, wherein the existing medium access control control element is a power headroom control element.

11. A wireless communications method, comprising:
receiving data from a base station via a downlink at a data rate;
identifying data congestion at a user communications apparatus, wherein the data congestion is based at least in part on an ability of the user communications apparatus to process data received at the data rate for the downlink;
determining, by the user communications apparatus, a reduced data rate for the downlink and a time period for using the reduced data rate based at least in part on the identified data congestion;
transmitting, to the base station, a wireless signal comprising a medium access control control element that that indicates the reduced data rate, wherein the medium access control control element comprises a flow control timer value that indicates the time period for using the reduced data rate for the downlink; and
receiving data from the base station via the downlink at the reduced data rate.

12. The method of claim 11, wherein the medium access control control element is in addition to an existing set of medium access control control elements.

13. The method of claim 12, wherein the additional medium access control control element comprises a field to indicate a maximum transport block size.

14. The method of claim 12, wherein the additional medium access control control element comprises a field to indicate a relative maximum transport block size.

15. The method of claim 12, wherein the additional medium access control control element comprises a field to indicate the flow control timer value.

16. The method of claim 15, wherein the additional medium access control control element comprises a field to indicate a flow control bit to control application of the flow control timer value.

17. The method of claim 11, further comprising modifying an existing medium access control control element and transmitting the modified medium access control control element to the base station to indicate the reduced data rate.

18. The method of claim 17, wherein the existing medium access control control element comprises a field to indicate a reduced maximum transport block size.

19. The method of claim 17, wherein the existing medium access control control element comprises a field to regulate types of data to be sent by the base station to the user communications apparatus.

20. The method of claim 17, wherein the existing medium access control control element is a power headroom control element.

21. An apparatus operable in a wireless communication system, comprising:
means for receiving data from a base station via a downlink at a data rate;
means for identifying data congestion at a user communications apparatus, wherein the data congestion is based at least in part on an ability of the user communications apparatus to process data received at the data rate for the downlink;
means for determining, by the user communications apparatus, a reduced data rate for the downlink and a time period for using the reduced data rate based at least in part on the identified data congestion;
means for transmitting, to the base station, a wireless signal comprising a medium access control control element that indicates the reduced data rate, wherein the medium access control control element comprises a flow control timer value that indicates the time period for using the reduced data rate for the downlink; and
means for receiving data from the base station via the downlink at the reduced data rate.

22. The apparatus of claim 21, wherein the medium access control control element is in addition to an existing set of medium access control control elements.

23. The apparatus of claim 22, wherein the additional medium access control control element comprises a field to indicate a maximum transport block size.

24. The apparatus of claim 22, wherein the additional medium access control control element comprises a field to indicate a relative maximum transport block size.

25. The apparatus of claim 22, wherein the additional medium access control control element comprises a field to indicate the flow control timer value.

26. The apparatus of claim 25, wherein the additional medium access control control element comprises a field to indicate a flow control bit to control application of the flow control timer value.

27. The apparatus of claim 21, further comprising means for modifying an existing medium access control control element and transmitting the modified medium access control control element to the base station to indicate the reduced data rate.

28. The apparatus of claim 27, wherein the existing medium access control control element comprises a field to indicate a reduced maximum transport block size.

29. The apparatus of claim 27, wherein the existing medium access control control element comprises a field to regulate types of data to be sent by the base station to the user communications apparatus.

30. The apparatus of claim 27, wherein the existing medium access control control element is a power headroom control element.

31. A non-transitory computer-readable medium comprising code for causing at least one computer to:
receive, at a user communications apparatus, data from a base station via a downlink at a data rate;
identify data congestion at a user communications apparatus, wherein the data congestion is based at least in part on an ability of the user communications apparatus to process data received at the data rate for the downlink;
determine, by the user communications apparatus, a reduced data rate for the downlink and a time period for using the reduced data rate based at least in part on the identified data congestion;
transmit, to the base station, a wireless signal comprising a medium access control control element that indicates the reduced data rate, wherein the medium access control control element comprises a flow control timer value that indicates the time period for using the reduced data rate for the downlink; and
receive data from the base station via the downlink at the reduced data rate.

32. The non-transitory computer-readable medium of claim 31, wherein the medium access control control element is in addition to an existing set of medium access control control elements.

33. The non-transitory computer-readable medium of claim 32, wherein the additional medium access control control element comprises a field to indicate a maximum transport block size.

34. The non-transitory computer-readable medium of claim 32, wherein the additional medium access control control element comprises a field to indicate a relative maximum transport block size.

35. The non-transitory computer-readable medium of claim 34, wherein the additional medium access control control element comprises a field to indicate the flow control timer value.

36. The non-transitory computer-readable medium of claim 35, wherein the additional medium access control control element comprises a field to indicate a flow control bit to control application of the flow control timer value.

37. The non-transitory computer-readable medium of claim 31, further comprising code for causing at least one computer to modify an existing medium access control control element and transmitting the modified medium access control control element to the base station to indicate the reduced data rate.

38. The non-transitory computer-readable medium of claim 37, wherein the existing medium access control control element comprises a field to indicate a reduced maximum transport block size.

39. The non-transitory computer-readable medium of claim 37, wherein the existing medium access control control element comprises a field to regulate types of data to be sent by the base station to the user communications apparatus.

40. The non-transitory computer-readable medium of claim 37, wherein the existing medium access control control element is a power headroom control element.

41. The non-transitory computer-readable medium of claim 31, wherein the medium access control control element comprises at least one additional field comprising:

a maximum transport block size field that indicates a maximum transport block size;

a relative maximum transport block size field that indicates a percentage of the maximum transport block size that the user communications apparatus is able to support;

a flow control timer value field that indicates a flow control timer value; and a flow control bit field that controls application of the flow control timer value.

* * * * *